W. M. DUNCAN.
SELF LUBRICATING WHEEL.
APPLICATION FILED MAY 8, 1908.
903,551.
Patented Nov. 10, 1908.
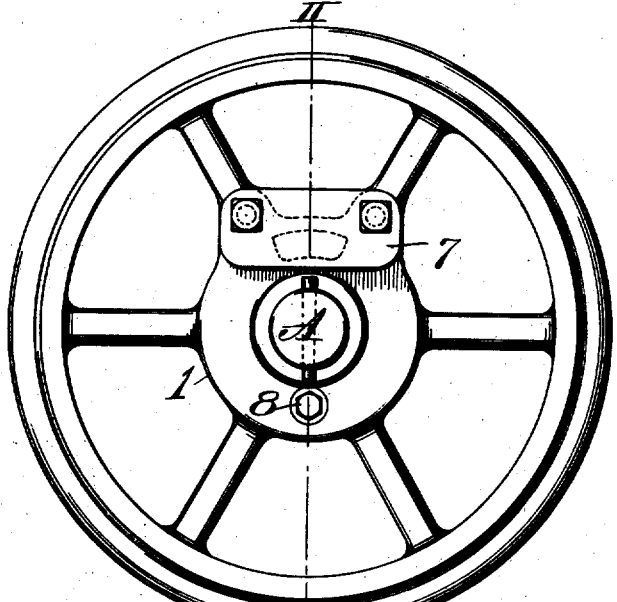
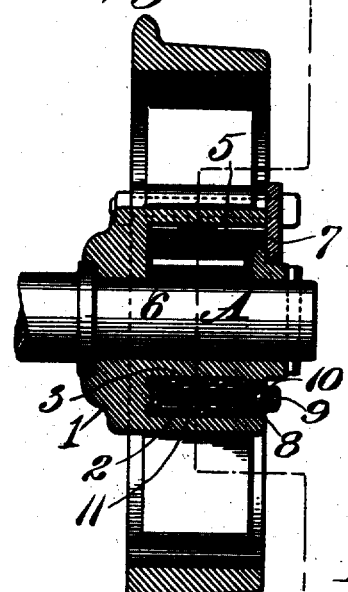
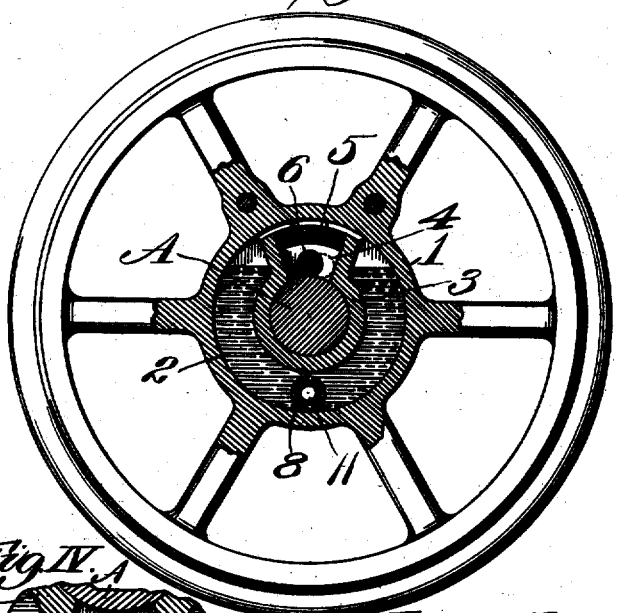
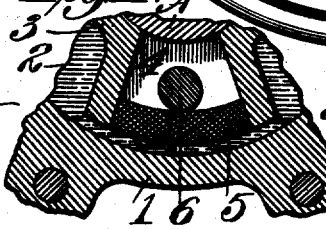
Attest:
Wm. Ferth
L. Rost
Inventor:
Wm. M. Duncan,
by Fullwright
Atty.

UNITED STATES PATENT OFFICE.

WILLIAM M. DUNCAN, OF ALTON, ILLINOIS.

SELF-LUBRICATING WHEEL.

No. 903,551.   Specification of Letters Patent.   Patented Nov. 10, 1908.

Application filed May 8, 1908. Serial No. 431,550.

*To all whom it may concern:*

Be it known that I, WILLIAM M. DUNCAN, a citizen of the United States of America, residing in Alton, county of Madison, and State of Illinois, have invented certain new and useful Improvements in Self-Lubricating Wheels, of which the following is a full, clear, and exact description, reference being had to the accompanying drawings, forming part of this specification.

My invention relates to an improvement in self-lubricating wheels and it has for its object the construction of a device of this character which is of simple and efficient nature and provides for the lubrication of journals upon which wheels of various descriptions are operable.

Figure I is a side elevation of a wheel made in accordance with my invention. Fig. II is a cross section taken on line II—II, Fig. I. Fig. III is a view partly in elevation and partly in section taken on line III—III, Fig. II. Fig. IV is an enlarged section showing the lubricant gathering members of the wheel in the positions assumed when they are receiving the lubricant.

In the accompanying drawings: A designates a journal which may be that of a car axle, or it may be that of a shaft of any description, although as shown it is the journal of a car axle.

1 designates the hub of my self-lubricating wheel which wheel, as shown, is a car wheel although it may be a wheel of any other description. Within the hub 1 is a lubricant well 2 that extends between the outer shell of the hub and an inner journal sleeve 3. The journal sleeve 3 is provided with a duct or cavity 4 that extends outwardly from the body of the sleeve and through which communication is established from the lubricant well to the interior of the sleeve and the journal A located therein. The side walls of the duct 4, preferably converge toward the center of the journal sleeve, as seen in Figs. III and IV.

5 is an absorbent body preferably of felt that is located in the duct 4 at its outer end and which receives lubricant from the well 2, the lubricant being taken up by capillary attraction in the said body.

In the duct 4 and between the absorbent body 5 and the journal is a lubricating roller 6 that is adapted to revolve freely at all times in said duct, during rotation of the journal.

In the practical use of my self-lubricating wheel, the lubricant is taken up by the absorbent body 5, while said body is moving in a downward direction and returning in an upward direction, so that the body is kept constantly saturated, and while the absorbent body is moving through the lower portion of its travel, the lubricating roller rolls in contact with said absorbent body, thereby causing it to become coated with lubricant. Then, as the wheel continues to revolve around the journal, the lubricating roller moves inwardly to the journal and the coating of lubricant thereon is transferred from the roller to the journal.

Access to the duct 4 for the introduction thereinto of the absorbent 5 and the lubricating roller 6 may be furnished by an opening at one end of the hub 1, which is in the use of the wheel closed by a cover plate 7. Lubricant may be introduced into the lubricant wheel in any suitable manner, but I prefer to employ the valve controlling device shown in the drawings and which consists of a plug sleeve 8 that is inserted through one of the end walls of the hub 1, and the wall of which within the lubricant well is perforated or slotted. The plug sleeve is provided with an inlet 9 that is normally closed by a valve 10, yieldingly held to its seat by a spring 11 and which is adapted to be unseated by the introduction of the spout of an oil can through the inlet 9.

I claim:

1. The combination with a journal, of a self lubricating wheel having a hub provided with a bearing surface containing a lubricant well and a duct leading from the well to said bearing surface, an absorbent body in said duct, and a journal lubricating member in said duct by which lubricant may be transferred from said absorbent body to said journal.

2. The combination with a journal, of a self lubricating wheel having a hub provided with a bearing surface and containing a lubricant well and a duct leading from the well to said bearing surface, an absorbent body in said duct, and a journal lubricating member in said duct by which lubricant may be transferred from said absorbent body to said journal; said journal lubricating member being freely mounted in said duct to move to and from said absorbent body and said journal.

3. A self-lubricating wheel having a hub comprising an outer shell and an inner sleeve to provide a lubricant well between said members, the sleeve being provided with a duct in communication with said well, an absorbent body in said duct, and a lubricating roller in said duct between said absorbent body and the inner end of the duct, substantially as set forth.

4. A self-lubricating wheel having a hub comprising an outer shell and an inner sleeve to provide a lubricant well between said members, the sleeve being provided with a duct in communication with said well, an absorbent body in said duct, and a lubricating roller in said duct between said absorbent body and the inner end of the duct; said duct being of sufficient transverse dimension to permit a free revolution of said lubricating roller, substantially as set forth.

W. M. DUNCAN.

Witnesses:
C. A. CALDWELL,
H. R. OWEN.